Fig. 1

INVENTOR.
Max Knobel
BY Thomas P. Howard

J. Stanley Churchill
ATTORNEY

Fig. 2

INVENTOR.
Max Knobel
Thomas P. Howard
BY
J. Stanley Churchill
ATTORNEY

Feb. 10, 1953

M. KNOBEL ET AL

2,628,055

CHECK-WEIGHING MACHINE

Filed Oct. 24, 1951

INVENTOR.
Max Knobel
BY Thomas P. Howard
J. Stanley Churchill
ATTORNEY

Feb. 10, 1953  M. KNOBEL ET AL  2,628,055
CHECK-WEIGHING MACHINE
Filed Oct. 24, 1951  7 Sheets-Sheet 4

INVENTOR
Max Knobel
Thomas P. Howard
BY J. Stanley Churchill
ATTORNEY

Feb. 10, 1953

M. KNOBEL ET AL 2,628,055

CHECK-WEIGHING MACHINE

Filed Oct. 24, 1951

INVENTOR
Max Knobel
Thomas P. Howard

BY J. Stanley Churchill
ATTORNEY

INVENTOR.
Max Knobel
BY Thomas P. Howard
J. Stanley Churchill
ATTORNEY

Patented Feb. 10, 1953

2,628,055

UNITED STATES PATENT OFFICE 2,628,055

CHECK-WEIGHING MACHINE

Max Knobel, Boston, and Thomas P. Howard, Milton, Mass., assignors to Pneumatic Scale Corporation, Limited, Quincy, Mass., a corporation of Massachusetts Application October 24, 1951, Serial No. 252,834

15 Claims. (Cl. 249—2)

1

This invention relates to a check-weighing machine.

The invention has for an object to provide a novel and improved and rapidly operating check-weighing apparatus in which provision is made for determining the deviation in the weight of an article from a predetermined weight and for ascertaining the average algebraic deviation of a plurality or group of the weighed articles from a predetermined weight and for indicating and preferably graphically recording the average algebraic deviation from such predetermined weight of the group thus check weighed.

With this general object in view and such others as may hereinafter appear, the invention consists in the check-weighing apparatus and in the various structures, arrangements, and combinations of parts hereinafter described and particularly defined in the claims at the end of this specification.

2

In general, in the present check-weighing apparatus provision is made for determining the variation in the weight of the article or load from a predetermined weight, preferably by a weighing element including rapidly operating, relatively stiff spring means, and provision is also made for ascertaining the average algebraic deviation of a plurality or group of weighed articles from the predetermined weight and for indicating such average algebraic deviation. The machine embodies novel pneumatically operated mechanism of a highly sensitive nature which cooperates with the weighing element to rapidly and accurately translate the minute movement of the weighing element under the influence of the excess of the weight of the load being check weighed above the minimum weight limit for which the weighing system may be adjusted, into the linear movement of a totalizing mechanism by which the average algebraic deviation may be ascertained. Provision is preferably made for graphically recording such average algebraic deviations, as will be described.

Referring to the drawings, the invention in one of its aspects contemplates novel check-weighing apparatus which is highly useful for any of the industrial purposes for which present check-weighing apparatus is or may be used. The present check-weighing apparatus may be used to control a gross-weight weighing apparatus operatively connected to check-weighing mechanism, or net-weight weighing apparatus operatively connected to check-weighing mechanism, or a volumetric filling apparatus operatively connected to check-weighing mechanism, and provision is made in all of the three embodiments of the invention described for controlling the operation of the packaging machine to correct the formation of the weighed or measured loads in response to determinations of the average algebraic deviations beyond definite amounts from a predetermined weight of a plurality or group of the check-weighed loads.

Reference is made to U. S. patent to Howard No. 2,116,895 for a complete disclosure of the gross-weight weighing apparatus shown in Figs. 1 to 8. Reference is also made to the U. S. patent to Howard No. 2,364,902 for a more complete disclosure of the net-weight weighing machine illustrated in Fig. 11; and reference is also made to the U. S. patent to Delamere et al. No. 1,527,030 for a complete disclosure of the volumetric filling machine shown in Fig. 12, and only sufficient portions of such patented machines have been herein illustrated as will enable the present invention to be understood, reference being made to such patents for a more complete disclosure thereof.

Figure 1:
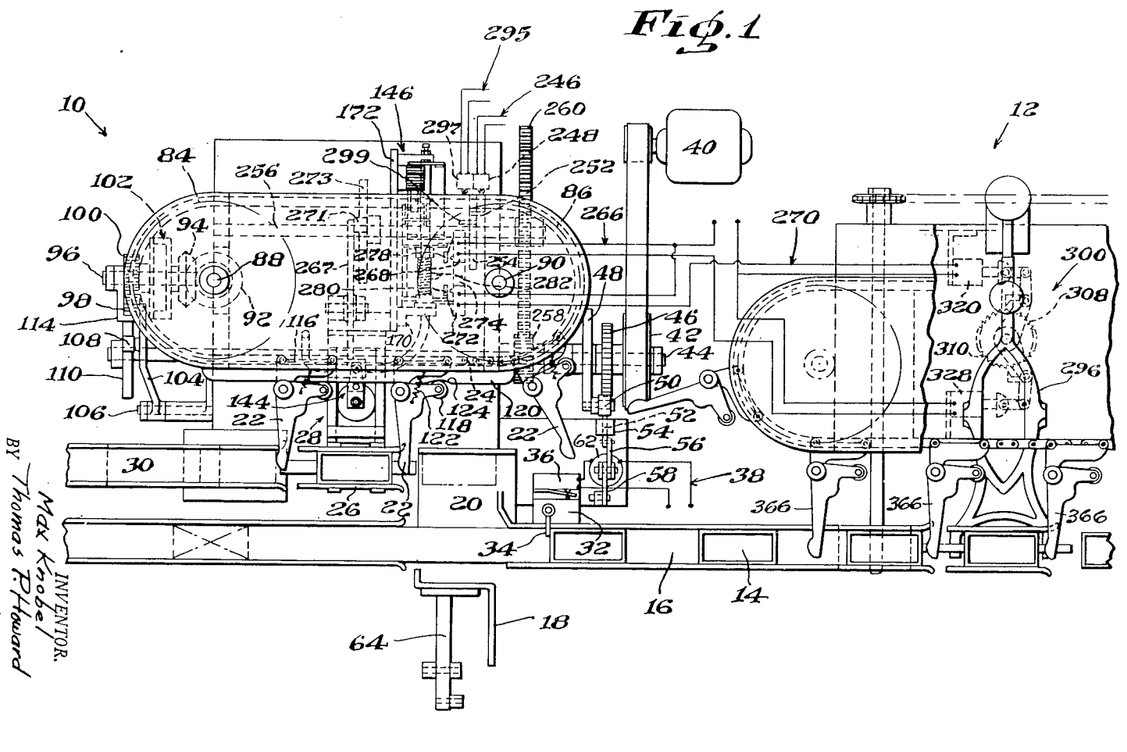
Fig. 1 is a plan view of the present check-weighing apparatus shown operatively connected to a gross-weight weighing machine for forming weighed loads in successive cartons.
Figure 8:
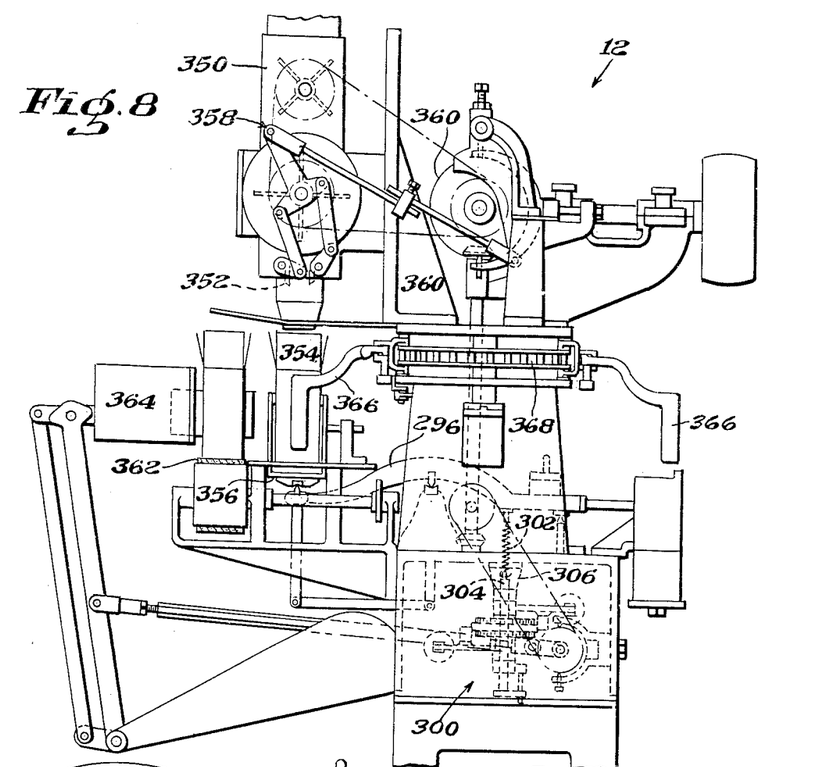
Fig. 8 is a side elevation of portions of the gross-weight weighing machine shown in Fig. 1 embodying mechanism for effecting corrections in the formation of the weighed loads in response to determinations of average algebraic deviations beyond definite amounts forming predetermined weight of a plurality of weighed loads.

The present check-weighing apparatus of itself is, as above set forth, useful for any of the purposes for which prior check-weighing apparatus has or may be used. In Figs. 1 and 8 we have illustrated a packaging machine wherein the check-weighing apparatus is operatively connected to and arranged to control the load-forming mechanism of a gross-weight weighing machine of the type illustrated in the Howard Patent No. 2,116,895, but it will be understood that the check-weighing apparatus may be used alone or for controlling other machines, as for example, the net-weight weighing machine shown in Fig. 11, and the volumetric filling machine shown in Fig. 12.

The present check-weighing apparatus is characterized by weighing mechanism which may comprise any usual or preferred type of weighing mechanism and which embodies novel means for determining, either directly or indirectly, the variation or deviation of an individual load or article being check weighed from a predetermined weight. The check-weighing apparatus further embodies novel means for ascertaining the average algebraic deviation of a plurality of the weighed loads or articles and for indicating, and preferably graphically recording, the amount of the average algebraic deviation of a group or plurality of such loads or articles.

The determination of the average algebraic deviation of the weights of a plurality of loads or particles being check weighed may be determined in various ways, as for example, each load or article may be check weighed, the deviations algebraically totalized, and the total divided by the number of articles or loads to give the average algebraic deviation. Another method involves the addition of the individual weights of the articles or loads making up the group, the division of this total by the number of articles in this group and the subtraction of the predetermined weight therefrom to give the average algebraic deviation. Another method involves the check weighing of each article of the group, the totalization of the weights, the division of the total by the number of articles in the group, and the subtraction of the predetermined weight therefrom to give the average algebraic deviation. Another method involves the weighing of all of the articles or loads in the group, the subtraction therefrom of the product of the number of articles times the predetermined weight, and then the division of this amount by the number of articles in the group, to give the average algebraic deviation.

When the present check-weighing apparatus is embodied in or operatively connected to a machine whose operation it is desired to control, as for example, a filling machine of either the weighing or measuring type, provision is made for controlling the operation of such machine in response to the average algebraic deviation of successive groups or samples comprising a plurality of the products or loads produced by such machine. In practice, the samples or groups should be uniformly taken at regular intervals over a day's run, and it is preferred that the number of individual articles or loads being produced by the machine to be controlled making up each sample group should at least equal three and preferably be five or more.

Experience has shown that this method of sampling and of controlling the operation of a machine, and particularly a packaging machine, possesses important commercial utility over prior attempts which have been made to control the operation of such machines by check weighing individual articles or loads produced and then attempting to continuously correct the machine in response to each deviation of an individual load or article from a predetermined weight. In many such instances the attempted corrections result in further increase in the deviations instead of in their reduction.

Figure 2:
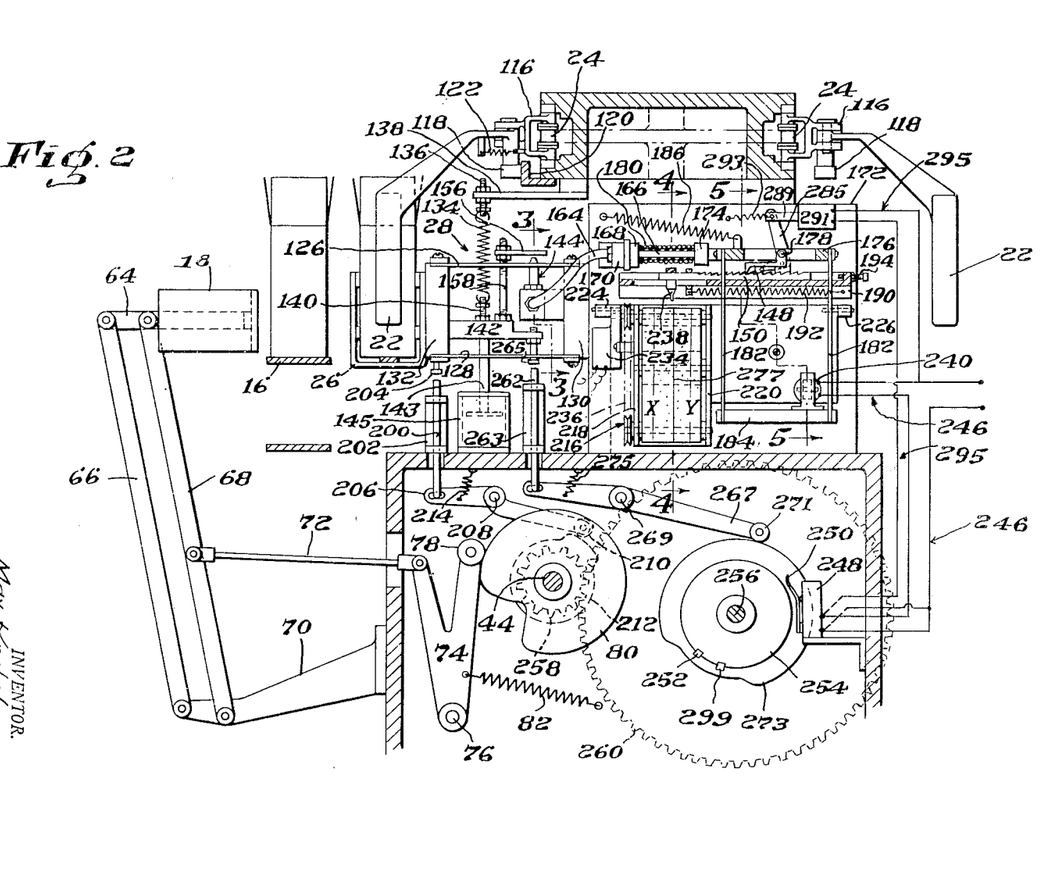
Fig. 2 is a side elevation, partly in cross section, of the present check weigher.

Referring now to Figs. 1 and 2, 10 represents the present check-weighing apparatus, and 12 represents a packaging machine illustrated in Fig. 1 as comprising a gross-weight weighing machine, from which the filled packages 14 may be delivered to the check-weighing apparatus by a continuously moving conveyor belt 16. The packages delivered from the weighing machine 12 are arranged to be transferred by a package pusher 18 from the delivery belt 16 onto a receiving plate 20 and into the path of intermittently movable carrier arms 22, a plurality of which are mounted on a carrier chain 24 forming a part of the check-weighing apparatus. In operation, the package on the receiving plate 20 is moved onto the scale pan 26 of the check-weigher scale beam 28, the preceding package on the platform being thereby moved onto a continuously moving discharge conveyor 30 to be delivered from the machine.

While the present check-weighing machine may be arranged to check weigh successive packages delivered from the weighing machine, in practice, it is preferred to transfer alternate packages from the delivery belt into the check-weighing apparatus.

The mechanism for controlling the transfer of alternate packages from the delivery belt 16 onto the receiving plate 20 may include a commercially available counter 32 mounted adjacent one side of the conveyer and having an arm 34 arranged to be engaged by the packages moved therepast. The counter 32 is designed to be actuated to close a micro-switch 36 when the arm 34 is engaged by alternate packages. The micro-switch 36 forms part of a circuit 38 for initiating a cycle of operation of the check-weighing apparatus thus effecting transfer of alternate packages into the check weigher, the intermediate packages being permitted to continue their progress along the conveyer belt past the package pusher 18 and out of the machine, as indicated in Fig. 1. It will be apparent that in practice the counter 32 may be arranged to be actuated to initiate a cycle of operation and effect the transfer of a package into the check weigher upon engagement of the arm 34 by any sequence of packages, such as every third or every fifth package passing along the conveyer, including successive packages, as desired.

Figures 3, 4, 5, 6, 7:
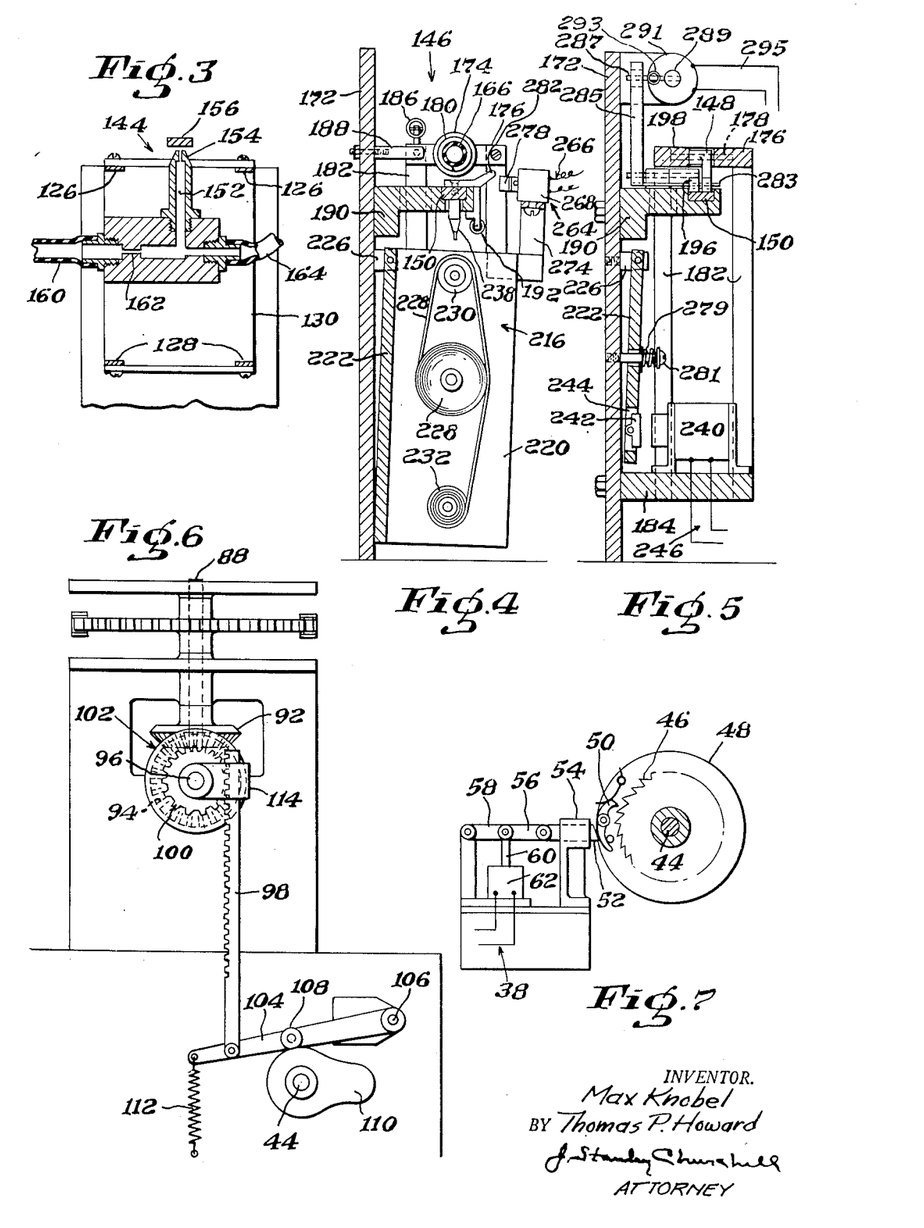
Figs. 3, 4, and 5 are cross-sectional views taken on the lines 3—3, 4—4, and 5—5 respectively of Fig. 2.
Fig. 6 is a side elevation of the carrier-driving mechanism as viewed from the left in Fig. 1.
Fig. 7 is a side elevation of a portion of the driving mechanism as viewed from the right in Fig. 1.

As illustrated in Fig. 1, the check weigher 10 may be driven from a motor 40 belted to a pulley 42 loosely mounted on a main cam shaft 44, the pulley being formed integrally with a ratchet 46 forming the driving member of a one-revolution clutch. The driven member of the clutch comprises a pawl-carrier disk 48 fast on the cam shaft and provided with a spring-pressed pawl 50 arranged to cooperate with the ratchet to effect rotation of the cam shaft 44 when the pawl stop is withdrawn. Provision is made for controlling the operation of the one-revolution clutch to initiate a cycle of operation of the check-weighing apparatus when the counter-operated micro-switch circuit 38 is closed and to discontinue driving engagement of the clutch at the end of one revolution. As shown in Fig. 7 a pawl stop 52 slidingly mounted in a bracket 54 is arranged to normally engage the tail of the pawl 50 to maintain the same out of driving engagement with the ratchet 46. The pawl stop is connected by toggle links 56, 58 to the armature 60 of an electromagnet 62 connected in the micro-switch circuit 38. In operation, when the micro-switch 36 is closed by the counter 32, the electromagnet is energized to withdraw the pawl stop 52 and permit driving engagement of the spring-pressed pawl with its ratchet. Immediately thereafter the spring turns the pawl stop into the path of the pawl to disengage the same from the ratchet and discontinue rotation of the cam shaft at the end of one revolution.

Upon initiation of a cycle of operation of the cam shaft 44, the package pusher 18 is arranged to be operated to transfer a package from the belt 16 onto the receiving plate 20, and as shown in Fig. 2, the package pusher is mounted on a bar 64 supported by parallel links 66, 68 which are rockingly supported at their lower ends in a bracket 70 attached to the machine frame and arranged to impart a substantially straight-line movement to the pusher. One of the links 68 is connected by a rod 72 to one arm of a cam lever 74 pivotally mounted at 76, the second arm being provided with a cam roll 78 cooperating with a package-pusher cam 80 fast on the shaft 44. A spring 82 is connected to the lever 74 to hold the cam roll against its cam.

The package-carrier chain 24 is then moved to advance the packages one station of operation. As herein shown, the carrier chain is arranged to run around sprockets 84, 86 mounted on vertical shafts 88, 90 respectively, journaled in the machine frame at each end of the machine. One of the shafts 88 is provided with a bevel gear 92 arranged to mesh with a bevel gear 94 fast on a horizontal shaft 96, see Fig. 6. Provision is made for intermittently rotating the horizontal shaft 96 to effect advancement of the carriers through cam-operated connections including a gear rack 98 arranged to mesh with a pinion 100 loosely mounted on the shaft 96 and formed integrally with the driving member of a unidirectional clutch of conventional design, indicated generally at 102, the driven member of the clutch being fast on the shaft 96. The rack 98 is connected at its lower end to a cam lever 104 which is rockingly mounted at 106 and is provided with a cam roll 108 for cooperation with a cam 110 fast on the cam shaft 44. A spring 112 connected to the outer end of the lever 104 is arranged to hold the roll against its cam and to effect downward movement of the rack. A retaining member 114 loosely carried on the outer end of the shaft 96 is arranged to retain the rack in engagement with its pinion. In operation, when the rack 98 is moved in one direction the driving and driven members of the unidirectional clutch 102 are in driving engagement to effect rotation of the shaft 96 and advancement of the packages, and when the rack is moved in the opposite direction the clutch members are disengaged to prevent reverse rotation of the shaft during the return of the rack to its initial position. It will be observed that the carrier arms 22 are pivotally mounted on carrier members 116 attached to the carrier chain 24, each carrier being provided with a roller 118 arranged to engage a stationary cam piece 120 in order to maintain the arms 22 extended substantially at right angles to the chain during the movement of the carriers. The carriers are urged to rock in a counterclockwise direction, viewing Fig. 1, by a spring 122 connected between the carrier 22 and its supporting member 116. In order to permit each carrier arm to be retracted or to rock away from the package at the check-weighing station when the chain comes to rest, the cam piece 120 may be provided with a low spot 124, thus preventing interference with the weighing operation.

From the description thus far it will be observed that alternates of successive filled packages delivered from a packaging machine are arranged to initiate a cycle of operation of the check weigher and that such alternate packages are transferred into the check weigher and moved onto the platform 26 of the check-weighing scale beam 28. As illustrated in Figs. 2 and 3, the illustrated check-weighing unit comprises a four-bar parallel linkage wherein the upper and lower horizontal links 126, 128 respectively comprise relatively stiff cantilever leaf springs of equal length. The springs 126, 128 are attached at one end to a rigid member comprising a block 130 attached to the machine frame, and the other ends of the springs are secured to a second rigid member or block 132 to which the weighing platform 26 is attached. The two rigid members 130, 132 together with the springs 126, 128 constitute the four-bar linkage so that when a load is placed on the weighing platform 26 the weight of the load results in imparting to the platform a substantially straight-line motion in a vertical direction so that the load produces the same spring deflection no matter where it is located on the platform. The first rigid member 130, being attached to the machine frame, serves as a rigid support for the entire structure of the weighing unit, and a coil spring 134 connected between a portion of the weighing unit and a fixed portion of the machine serves to exert a counterforce upon the spring beam. The upper end of the spring 134 may be secured to a supporting bolt 136 adjustably carried by a bracket 138 attached to the machine frame, and the lower end of the spring 134 may be secured to a bolt 140 adjustably carried by a bracket 142 projecting from and forming a part of the second rigid member 132 to which the weighing platform is attached. In practice, the coil spring 134 serves to counteract the weight of the platform 26 and associated parts which are mounted upon the outer ends of the lead springs 126, 128 and may be relatively long and of such strength as to support nearly all of the weight of the package or article being check weighed without deflection of the leaf springs so that the deflection of the leaf springs may be proportionate to the deviation on weight above a predetermined minimum weight limit. For example, a package weigher of 15 ounces may be used and weights above 15 ounces will deflect the leaf springs proportionately to the excess above 15 ounces. For a heavy load a heavy coil spring may be employed, and for a light load a lighter one may be used. It is preferred that the coil spring 134 be relatively long and large in diameter so that the counterforce will not materially increase or upset the desired sensitivity of the weighing unit during the elongation of the spring when the cantiliver leaf springs are depressed. In order to damp any undesirable vibratory oscillations of the spring beam unit 28 during the weighing operation, a depending rod 143 secured to the projection 142 of the rigid member 134 may be provided with a piston extended into a dash pot 145, as illustrated.

From the description thus far it will be apparent that the minimum selected weight, for example, the 15 ounces above referred to will vary according to the operating characteristics of the filling machine, and will be selected so that deviations therefrom will be above such minimum weight.

In practice, the stiff cantilever springs 126, 128 are selected so that the weighing unit has a relatively small deflection value, and sensitive, pneumatically operated gauging means, indicated generally at 144, is arranged to cooperate with the present cantilever weighing unit for indicating or measuring the relatively small deflection of the spring beam when depressed by the load being check weighed. In general, the pneumatically operated gauging unit is of a construction as will be described such that the deflection of the leaf springs increases the air pressure in the pneumatically operated unit by an amount proportionate to the deflection and consequently to the excess or deviation in weight above the selected minimum as above described.

Provision is made as will be described for totalizing the weight in excess of the minimum weight limit of each of the N packages in the group or plurality of packages comprising the sample being check weighed. This totalized figure will thus be N times the average weight of the group, and by utilizing a graph paper having a scale per ounce equal to N times the displacement per ounce of the totalizing device, it is possible to read directly in ounces the totalized displacement as the average weight of the group of N packages.

As best shown in Fig. 3, the pneumatically operated gauging unit may comprise a conduit having a chamber 152 through which the air under substantial pressure may be caused to flow to be discharged through a small discharge orifice 154 arranged to cooperate with a valve member 156 carried by and adjustably mounted on a vertical rod 158 attached to the projection 142 of the rigid member 132. The inlet of the conduit unit may be supplied with a regulated source of air through a flexible air hose connection 160, and the chamber 152 is provided with a restricted throat portion 162 adjacent its inlet end arranged to offer a substantial resistance to the flow of air therethrough. In operation, the leaf-spring weighing unit is normally maintained in a slightly elevated or locked position with the valve member 156 spaced a sufficient distance from the orifice 154 so that a relatively low air pressure is maintained in the chamber 152 during the package-moving period of operation, and after a package is placed on the platform 26 the beam is unlocked to permit it to perform the check-weighing operation. Upon minute deflection of the spring bear under the influence of the load weight in excess of the selected minimum, as for example, the 15 ounces above referred to, the valve 156 is moved toward the discharge orifice 154 a minute amount, thereby effecting a substantial pressure increase in the chamber 152 between the discharge orifice 154 and the throat portion 162, and provision is made for utilizing the increase in pressure to effect operation of indicating mechanism generally referred to as 146.

As illustrated in Fig. 2, the pneumatic gauging unit 144 is connected by a flexible hose 164 to an expansible tube 166 supported at one end in an adapter collar 168 fixed in a bracket 170 attached to an upstanding plate 172 forming a part of the machine frame. The expansible tube 166 is connected at its other end to a second adapter 174 which is attached to a pawl-carrying bracket 176 in which the advancing pawl 148 is pivotally mounted at 178. The expansible tube 166 may and preferably will be provided with a spring covering 180 tightly wound thereabout to prevent lateral expansion of the tube and to force the tube to elongate when the pressure therewithin is increased thus effecting movement of the pawl-carrying member 176 to the right viewing Fig. 2 to retract the pawl relative to its rack 150. Upon a subsequent decrease in pressure within the expansible tube 166 when the leaf spring beam is again locked, the contraction of the expansible tube permits movement of the pawl-carrying bracket 176 to the left to advance the rack 150 an increment of movement proportional to the weight of the load in excess of the selected minimum weight.

As herein shown, the pawl-carrying bracket 176 is supported upon vertical leaf springs 182 supported at their lower ends in a bracket 184 attached to and extended from the frame plate 172, the pawl-carrying bracket 176 and the fixed bracket 184 together with the leaf springs 182 forming a four-bar parallel linkage permitting horizontal reciprocation of the pawl-carrying member 176 with the tube 166 when the latter is elongated and contracted by the increase and decrease in air pressure respectively. The pawl-carrying member 176 is normally urged in a position to the left, viewing Fig. 2, by a spring 186 connected between the member 176 and a stud secured to the frame plate 172, the movement to the left being limited by a stop member 188 attached to the frame plate.

As illustrated in Figs. 2, 4, and 5, the rack 150 is slidably mounted in a groove formed in an angle bracket 190 attached to the frame plate 172, the rack being provided with a plurality of teeth for cooperation with the advancing pawl 148. The rack 150 is normally urged to the right by a spring 192 connected between the rack and a stud fast in the angle bracket 190, the end of the rack when in its fully retracted position being arranged to bear against an adjustable stop screw 194 carried by the angle bracket 190. A holding pawl 196 pivotally mounted in a bearing block 198 fixed to the bracket 190 serves to retain the rack in its advanced position until subsequently released as will be hereinafter described.

The spring-beam check-weighing unit 28 is arranged to be maintained in an elevated or locked position during the package moving cycle of operation by a vertically reciprocal rod 200 slidingly mounted in a bracket 202 attached to the machine frame, the upper end of the rod being arranged to engage a stud 204 attached to the underside of the rigid member 132 of the weighing unit. The lower end of the rod 200 is bent at right angles and extended through a slot formed in the end of a cam lever 206 pivotally mounted at 208, the second arm of the lever carrying a cam roll 210 cooperating with a cam 212 fast on the cam shaft 44. In operation, the cam 212 effects unlocking of the spring-beam unit 28 each cycle of operation after a package to be check weighed is advanced onto the weighing platform 26, and after a sufficient time to insure performance of the check-weighing operation the spring beam is again locked. A spring 214 connected to the lever 206 is arranged to hold the cam roll against its cam.

With this construction it will be seen that in operation when the spring-beam unit 28 is released or unlocked to perform the check-weighing operation, the pressure in the chamber 152 is increased by the movement of the valve 156 toward the orifice 154 when the spring beam is deflected, and consequently, the expansible tube 166 will be elongated to move the pawl-carrying bracket and its pawl 148 to the right viewing Fig. 2. The pawl 148, being pivotally mounted, rides over the teeth of the rack 150 during this stroke and falls into the tooth where it comes to rest. Thereafter, the spring beam 28 is again locked thus elevating the valve 156 away from the orifice 154 to effect a reduced pressure in the chamber 152 whereupon the tube 166 is contracted to permit the spring 186 to move the pawl-carrying bracket to the left and to advance the rack 150 an increment of movement comprising a measure of the excess in the weight of the load above the selected minimum weight, as for example, the 15 ounces above referred to. The holding pawl 196 retains the rack in the position to which it has been moved.

Provision is made in the preferred embodiment of the invention for totalizing successive increments of movement of the rack 150 produced by the check weighing of a predetermined number of packages in order to obtain an indication of the average algebraic deviation of the weight of a plurality of packages from a predetermined weight, and the total movement of the rack from an initial position provides a measure from which such average albebraic deviation may be readily determined. At the completion of a predetermined number of cycles of operation of the check weigher, provision is made for recording the average algebraic deviation thus determined on a roll of graph paper. The graph paper preferably has a central line indicating that the group of packages check weighed conforms to a predetermined weight, and any deviations from such predetermined weight being indicated by marks recorded on one or the other side of the central line in accordance with the position to which the rack 150 has been moved at the end of such predetermined number of cycles.

As shown in Figs. 2 and 4, the recording mechanism indicated generally at 216 is supported between side plates 218, 220 secured to a rocker plate 222 pivotally mounted in bearing blocks 224, 226 attached to the frame plate 172 and includes a supply roll 228 of recording paper, such as pressure-sensitive paper, which is guided over a rubber-covered roller 230 and then downwardly onto a rewinding roller 232. The paper is preferably arranged to be moved continuously at a relatively slow rate of speed by a small reduction gear motor 234 mounted on one side plate 218, and which is connected to the rubber-covered roller 230, the rewinding roller 232 being driven from the motor by a spring belt and pulley connection 236. As herein shown, the rack 150 is provided with a pen 238 depending from its underside and extended through a clearance slot formed in the angle bracket 190. The pen 238 is arranged to cooperate with the recording paper to mark the same, the marking operation being effected by rocking the plate 222 on its pivots to present the roller 230 and the paper to the pen. The rocking of the plate 222 may be effected by an electromagnet 240 mounted on the stationary bracket 184 and arranged to cooperate with an armature 242 pivotally connected to the rocker plate between the edges of a slot 244 formed therein as best shown in Fig. 5. The electromagnet 240 is included in a circuit 246 having a normally open micro-switch 248 provided with a spring arm 250 arranged to be engaged by a contact-closing member 252 secured to and extended laterally from a disk 254 fast on a cam shaft 256, see Figs. 1 and 2.

The cam shaft 256 may be driven from the main cam shaft 44 through a pinion 258 and gear 260 arranged to drive the shaft 256 at a reduced rate of speed proportional to the predetermined cycles of operation of the check weigher plus an aditional cycle of operation, and during such additional cycle the check weigher is rendered inoperative to effect movement of the rack 150. For example, assuming that five packages are to be check weighed before the recording mechanism is to operate, the main cam shaft 44 will make six revolutions for one revolution of the shaft 256, and the contact-closing member 252 is positioned on the disk 254 to close the switch 248 and energize the electromagnet 240 during the sixth or recording cycle.

The mechanism for rendering the check weigher inoperative to move the rack 150 during the recording cycle may comprise a second spring-beam lock herein shown as comprising a vertically reciprocal rod 262 slidingly supported in a bracket 263 attached to the machine frame. The upper end of the rod 262 is arranged to engage a stud 265 adjustably secured in the projection 142 from the second rigid member 132 of the spring-beam unit 28. The lower end of the rod is bent at right angles and extends through a slot formed in the end of a cam lever 267 pivotally mounted at 269. The second arm of the lever 267 is provided with a cam roll 271 cooperating with a cam 273 fast on the cam shaft 256. A spring 275 connected to the lever 267 is arranged to hold the roll against its cam.

Thus, in operation the plate 222 is rocked to present the paper to the marking pen 238 during the recording cycle whereby to provide a visual indication of the average deviation from a predetermined weight of a plurality of packages. In the event that successive packages being check weighed are all of a substantially predetermined weight, successive increments of movement of the rack 150 will be substantially uniform so that at the end of five cycles of operation the recording pen will be disposed substantially in alignment with the central line 277 of the recording paper indicating that the packaging machine is functioning correctly to produce loads of predetermined weights. In the event that some or all of the packages of the group check weighed vary from the predetermined weight but are each of a weight above the selected minimum, for example, above the 15 ounces above referred to, the marking pen 238 will be disposed to engage and mark the paper at a point to the right or left of the central line 277 as the case may be. Since the contact-closing engagement with the micro-switch 248 is substantially instantaneous, the rocker plate 222 will be immediately returned to its initial position after the marking operation is performed, the return movement being effected by a spring 279 coiled about a screw 281 attached to the frame plate 172. The screw is extended through an opening formed in the rocker plate, the spring being interposed between the plate and the head of the screw, as shown in Fig. 5. It will be understood that the rate of advance of the recording paper by the motor 234 may be such as to provide longitudinal spacing between successive markings on the paper.

After the recording operation has been performed, provision is made for releasing the rack 150 to enable it to return to its initial position to the right against the stop screw 194, and as herein shown a pin 283 carried by one arm of a bell crank 285 is arranged to extend under both the holding pawl 196 and the advancing pawl 148. The bell crank 285 is pivotally mounted in the stationary bearing block 198, the second arm of the bell crank being connected by a pin 287 to the end of an armature 289 of an electromagnet 291 secured to the frame plate 172. The bell crank is normally maintained in its inoperative position, to the left viewing Fig. 2, by a spring 293 connected between the pin 287 and a stud secured to the frame plate 172, as shown. The electromagnet 291 forms part of a circuit 295 including a second micro-switch 297 disposed beside the first micro-switch 248, see Fig. 1, and which is also provided with a spring arm arranged to be engaged by a second contact-closing member 299 carried by and laterally extended from the disk 254. The second contact-closing member 199 is spaced a short distance from the member 152 so that in operation, shortly after the marking operation is performed, the second micro-switch 297 is closed to energize the electromagnet 291, thus rocking the bell crank and lifting the pawls 196, 148 out of engagement with the rack 150 whereupon the latter is returned to its initial position by the spring 192.

In operation, the cumulated movements of the rack 150 at the end of the check weighing of a group sample or plurality of packages and the graphic recording of the average algebraic deviation of the members of the group will be such that the recordings on the graph paper either fall within or without predetermined limit lines X and Y shown in Fig. 2. The limit lines X and Y may be determined in any preferred manner, and when the check weigher is to be used to control a particular packaging or other machine, the performance of the packaging machine under normal conditions of operation is recorded on the graph, and after sufficient groups of packages have been check weighed and the records recorded so as to establish normal machine performance, the two limit pens for drawing the lines X, Y are set so as to automatically draw the limit lines, preferably so that the control limits X, Y are slightly more accurate than the normal machine performance. As illustrated in Figs. 1 and 4, when the rack 150 has moved so that the record of a group sample of check weighings is disposed to the left or right of the limit lines X and Y, provision is made for detecting such a position.

For purposes of illustrating the utility of the present check weigher, the latter is illustrated herein as operatively connected with a gross-weight weighing machine, or a net-weight weighing machine, or a volumetric filling machine. The detecting mechanism indicated generally at 264 may include an underweight circuit 266 having a normally open micro-switch 268 and an overweight circuit 270 having a normally open micro-switch 272. Each micro-switch is adjustably mounted in a bracket 274 attached to the side plates 218, 220 of the recording mechanism. In operation, when the plate 222 is rocked to form the graphic record the micro-switches 268, 272 carried by the recording mechanism are simultaneously moved toward the rack 150. As herein shown, the micro-switches are provided with switch arms 278, 280 respectively arranged to engage a lug 282 secured to and movable with the rack to effect closing of the respective switches during the recording and detecting operation.

Figure 9:
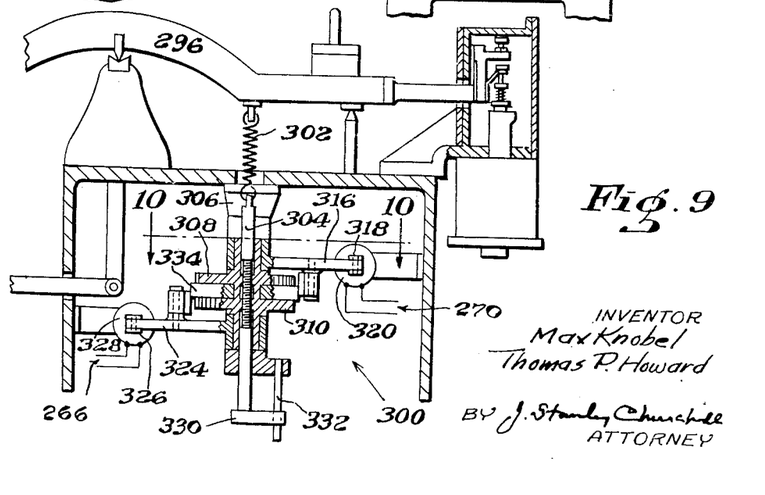
Fig. 9 is a cross-sectional detail view of the correcting mechanism shown in Fig. 8.

Referring now to Figs. 1 and 8, in which the check weigher 10 is illustrated as operatively connected to a gross-weight weighing machine, indicated generally at 12, in order to correct the operation of the load-forming mechanism thereof when the average algebraic deviation of a sample group of loads check weighed varies beyond a predetermined amount from the predetermined weight, provision is made for either increasing or decreasing by a definite increment the effective counterweight of the scale beam 296 of the weighing machine through correcting mechanism indicated generally at 300 arranged to be actuated by the detecting mechanism 264. As illustrated in detail in Figs. 9 and 10, the correcting mechanism includes a coil spring 302 connected between the counterweight end of the scale beam 296 and the upper end of a threaded stud 304 supported for vertical axial adjustment in a bracket 306 attached to the frame of the gross-weight weighing machine. The threaded portion of the stud 304 is arranged to cooperate with a dual ratchet member having integral opposed ratchets 308, 310 supported between upper and lower bearing members of the bracket 306 and which is arranged to be rotated in one direction to effect extension of the spring 302, thereby increasing the effective counterweight when the check-weighing machine detects an underweight condition, and to be rotated in the opposite direction to effect contraction of the spring 302 and reduction of the effective counterweight when the check-weighing machine detects an overweight condition.

Figures 10, 11:
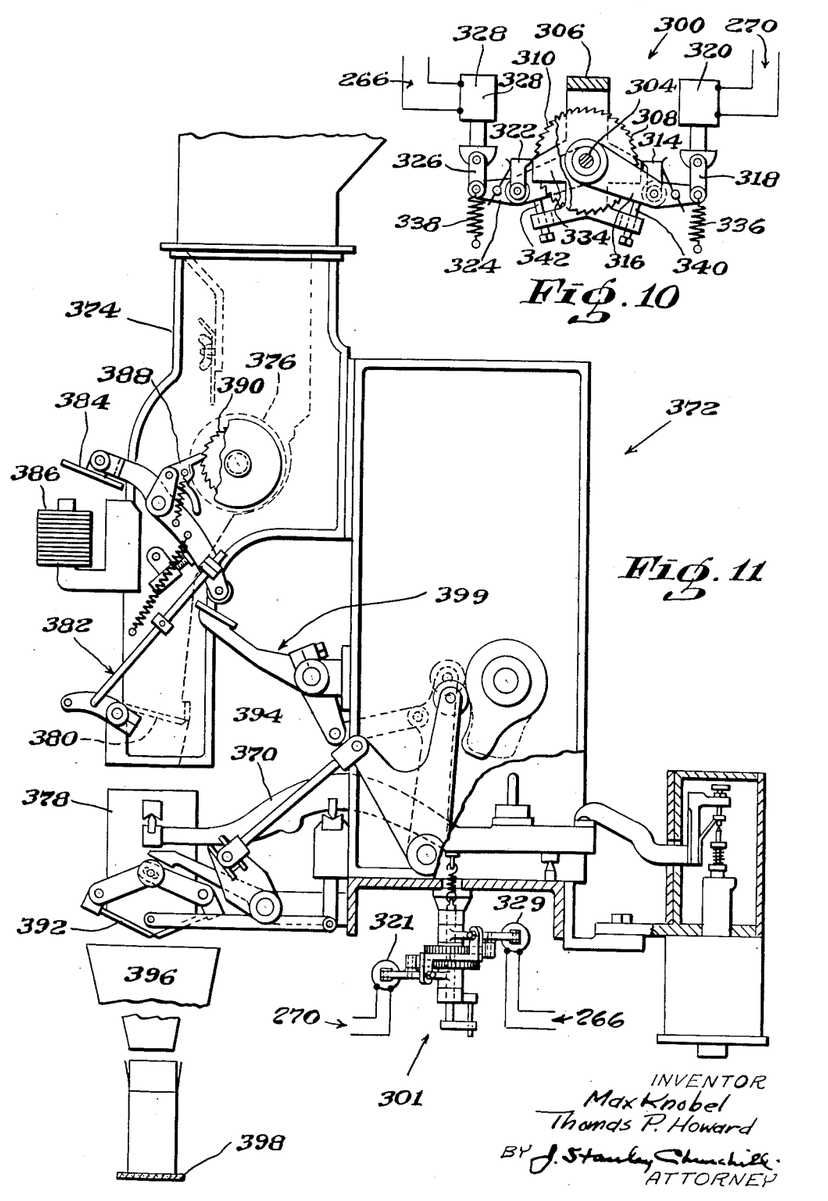
Fig. 10 is a plan view of the correcting mechanism.
Fig. 11 is a side elevation of a net-weight weighing machine embodying similar correcting mechanism and operatively connected to the present check weigher.

As best shown in Fig. 10, the upper ratchet 308 is arranged to be rotated a relatively small increment in a counterclockwise direction to contact the spring 302 by a spring-pressed pawl 314 carried by an arm 316 loosely journaled on an extended hub portion of the dual ratchet member, the outer end of the arm 316 being connected by a link 318 to a solenoid 320 connected in the overweight circuit 270 of the detecting mechanism 264, and the lower opposed ratchet 310 is arranged to be rotated in a clockwise direction to extend the spring 302 by a spring-pressed pawl 322 carried by an arm 324 loosely journaled on a depending hub portion of the dual ratchet member, the outer end of the arm 324 being connected by a link 326 to a solenoid 328 connected in the underweight circuit 266 of the detecting mechanism. The dual ratchet member is prevented from vertical axial displacement by engagement with the upper and lower bearing portions of the bracket 306, and the lower end of the spring stud 304 may be provided with a lateral extension 330 having an opening arranged to receive a guide pin 332 depending from the bracket 306 to prevent rotation of the stud. The pawls 314, 322 are normally maintained out of engagement with their respective ratchets by a shield member 334 extending from the bracket 306, and springs 336, 338 connected to the arms 316, 324 are arranged to retain the latter against limiting stops 340, 342 respectively to prevent engagement of the pawls with their respective ratchets until one or the other of the solenoids 320, 328 is energized by closing of the appropriate microswitch 272, or 268 in the detecting circuit.

From the description thus far, it will be seen that the gross-weight weighing machine 12 may be controlled from the check-weighing machine in the manner described, thereby maintaining the weight deviations of the packages produced within commercially acceptable weight variations. The weighing machine shown in Figs. 1 and 8 may comprise a weighing machine known in the trade as a two-scale weigher and which may be of the same general type as illustrated and described in the patent to Howard No. 2,116,895, to which reference may be had for a complete description thereof. For the purposes of the present invention, only sufficient portions of the complete weighing machine have been herein illustrated as appear to be necessary for a complete understanding of the present invention. In general, the illustrated weighing machine includes a feed hopper 350 provided with shutters 352 arranged to be opened to feed a stream of material into a carton 354 supported on the scale pan 356 of the scale beam 296, and in operation the shutters are arranged to be closed when the carton has received its weight through linkage indicated generally at 358 connected to cam-operated mechanism 360 arranged to be controlled by the scale beam. The machine is arranged to be operated in successive cycles, a complete cycle comprising a package-weighing cycle, and a package-moving cycle, and as herein shown the cartons may be delivered to the machine on a continuously moving inlet belt 362, successive cartons being transferred by a pusher 364 into the path of carrier fingers 366 carried on a chain 368 arranged to be intermittently operated to advance the cartons one station of operation each cycle, the filled and weighed package being removed from the scale pan 356 and transferred to the delivery conveyer 16, as shown in Fig. 1, to be delivered to the check-weighing machine 10. The above generally described mechanisms may comprise the mechanisms illustrated in the Howard patent above referred to.

Referring now to Fig. 11, similar correcting mechanism 301, arranged to be actuated by the check-weighing machine 10, may be embodied in a net-weight weighing machine indicated generally at 372 to cooperate with the scale beam 370 thereof. Such machine may comprise the weighing machine illustrated and described in the Howard Patent No. 2,364,902 to which reference may be had for a complete description thereof. In general the illustrated net-weight weighing machine includes a feed hopper 374 having a rotatable feed drum 376 arranged to feed material into a receptacle 378 carried by the weighing end of the scale beam 370. The hopper 374 is provided with a gate 380 at its lower end arranged to be held open during the weighing operation through linkage 382 including an armature 384 arranged to cooperate with a normally energized electromagnet 386 to hold the gate open. The electromagnet 386 forms part of a circuit arranged to be controlled by the scale beam 370, and in operation when the scale beam makes its weight, the electromagnet is de-energized to permit closing of the gate as shown. Simultaneously therewith, a pawl 388 carried by the linkage 382 is engaged with a ratchet 390 to discontinue rotation of the feed drum. Thereafter, the shutters 392 of the receptacle 378 are opened through cam-operated linkage 394 to release the weighed load which is guided through a funnel 396 into a carton supported therebeneath on a belt 398. The filled carton is then advanced along the belt 398 to be discharged onto the delivery belt 16 and delivered into the check-weighing machine as described. In the continued operation of the net-weight weighing machine, the shutters 392 are closed, and the gate 380 may be opened and the feed drum released by cam-operated resetting mechanism indicated generally at 399 which may and preferably will comprise the mechanism shown in the Howard Patent No. 2,364,902. As illustrated in Fig. 11, the correcting mechanism 301 may be similar in construction and mode of operation to the correcting mechanism 300 above described, the underweight and overweight solenoids 329, 321 being connected in the appropriate circuits 266, 270 of the check-weigher detecting mechanism.

Figure 12:
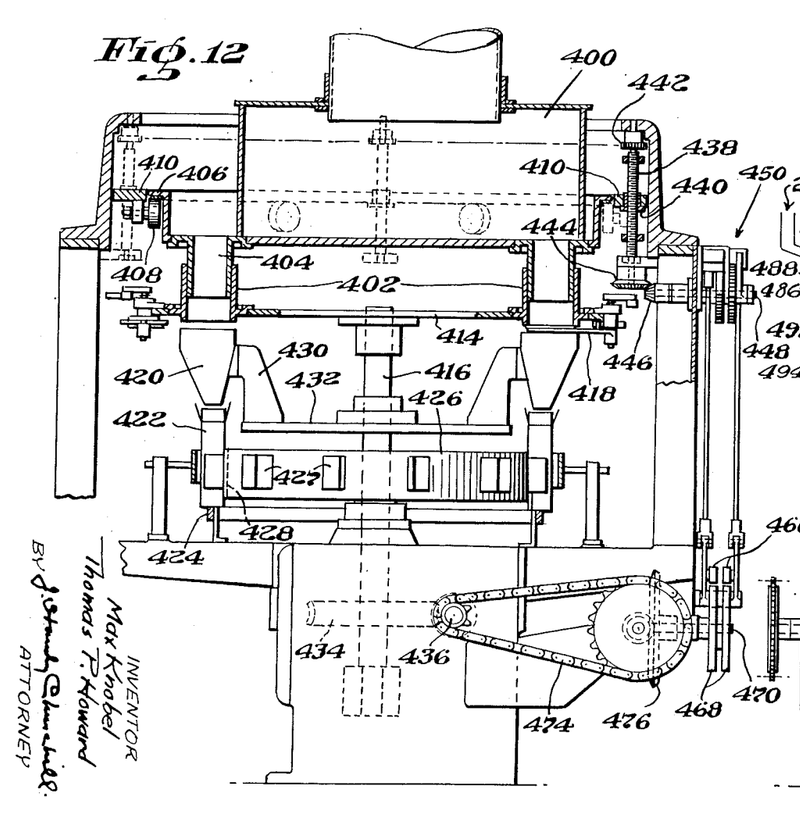
Fig. 12 is a cross-sectional view of a volumetric filler also embodying similar correcting mechanism operatively connected to the present check weigher.

Referring now to Fig. 12, in a modified form of the invention provision is made for correcting the volume of the measuring chambers of a volumetric filler in accordance with abnormal average algebraic deviations from a normal weight of the filled packages produced thereby as indicated by the detecting mechanism of the check weigher 10. As herein shown, the illustrated filling machine may comprise a rotary volumetric filler of the general type illustrated and described in the U. S. patent to Delamere et al. No. 1,527,030 and which may comprise a hopper 400 containing a supply of the material, and a series of telescopically adjustable measuring chambers 402 cooperating therewith. The upper portion 404 of the measuring chambers may be supported by an annular flanged member 406 arranged to ride on rollers 408 carried by an adjustably supported ring 410. The lower portions 412 of the measuring chambers may be supported on a disk 414 fast on the upper end of a continuously rotated central shaft 416, the telescoping connection imparting rotary movement to the upper portion 404 of the chambers. As herein shown, the chambers 402 are provided with cam-operated shutters 418, and in the operation of the machine successive chambers are filled as they pass under the hopper 400 during one portion of the revolution of the chambers during which time the shutters 418 are closed, and during another portion of the revolution the chambers 402 pass out from under the hopper and the shutters are opened to release the measured load which is guided through a funnel 420 and into a carton 422 being moved along in alignment therewith. The cartons may be advanced along rails 424 by a flexible metal belt 426 having a series of blocks 427 attached thereto and between which the cartons are engaged. The belt 426 may cooperate with a driving pulley 428 fast on the central shaft 416, and the funnels 420 are supported in alignment with the measuring chambers 402 by brackets 430 attached to a disk 432 also fast on the central shaft. As herein shown, the central shaft 416 may be driven through a worm-gear drive 434 connected to a drive shaft 436 which may be rotated by any usual or preferred means, such as an electric motor. In the operation of the filling machine, the cartons may be delivered to the machine from a supply thereof, and when provided with their measured loads, the filled cartons may be discharged from the machine and delivered to the check weigher 10 to check the weight thereof.

Provision is made in the modified form of the invention for automatically adjusting the upper portion 404 of the measuring chambers 402 relative to the lower portion 412 in order to vary the measured load when the average algebraic deviations of a group of the filled cartons are found to vary abnormally beyond commercially acceptable limits, as detected by the check weigher 10, and as herein shown, the adjusting mechanism may include a plurality of screws 438 rotatably mounted in the machine frame and arranged to cooperate with a nut 440 secured in the supporting ring 410. The screws 438 may be connected to rotate together by a chain and sprocket drive 442, and one of the screws may be provided with a bevel gear 444 arranged to mesh with a bevel gear 446 fast on a shaft 448 forming a part of the correcting mechanism indicated generally at 450. In operation rotation of the screws 438 in one direction will effect elevation of the upper portion 404 of the measuring chambers to increase the volume of subsequent loads delivered to the cartons, and rotation of the screws in the opposite direction will cause the upper portion of the chambers to be lowered into the lower portion to decrease the volume of the chambers.

Figures 13, 14:
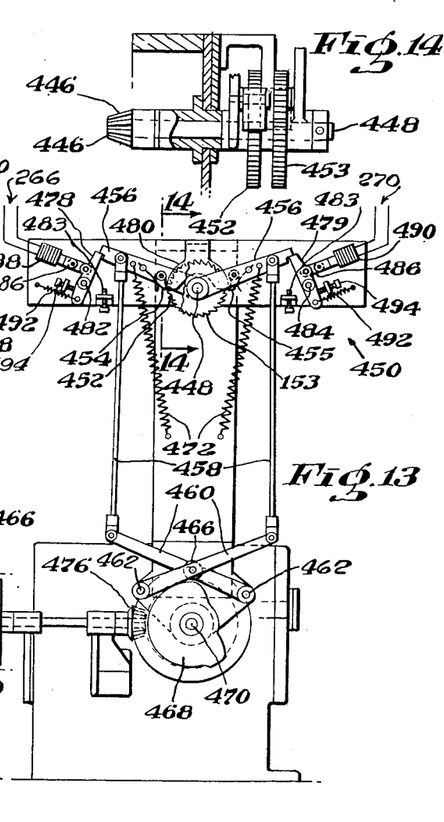
Fig. 13 is a side elevation of the volume-correcting mechanism shown in Fig. 12.
Fig. 14 is a detail view, partly in cross section, of the correcting mechanism as seen from the line 14—14 of Fig. 13.

As illustrated in Figs. 13 and 14, the correcting mechanism 450, adapted to be controlled in the manner described by the check-weighing machine 10, may include a pair of integral opposed ratchets 452, 453 fast on the shaft 448 and arranged to be engaged by similar spring-pressed pawls 454, 455 to effect rotation of the shaft 448 and adjustment of the chambers 402 when permitted to do so by the check-weighing machine. The pawls 454, 455 are carried by similar arms 456 pivotally mounted on the shaft 448, each arm being connected by a similar link 458 to cam levers 460 pivotally mounted at 462. Each lever 460 is provided with a roller 466 arranged to cooperate with similar cams 468 fast on a cam shaft 470, the arms 456 being provided with springs 472 arranged to urge the linkage downwardly to permit the roller to follow its cam. The cam shaft 470 is arranged to be rotated from the drive shaft 436 through a chain and sprocket drive 474 and bevel gears 476.

The pawl-carrying arms 456 are normally maintained in an elevated or locked position, as shown, by solenoid-operated latch members 478, 479 arranged to engage the ends of the arms, and the pawls are prevented from engaging their respective ratchets by a shield membr 480 supported from the machine frame. As herein shown, the latch members 478, 479 are pivotally mounted at 482, 484 and are connected by similar links 486 to their respective solenoids 488, 490. Springs 492 cooperating with adjustable stops 494 are arranged to hold the latch members 478, 479 in latched engagement with their respective arms 456, and in operation when one or the other of the arms is released by its solenoid the arm is rocked downwardly by its spring 472 permitting the roller 466 to follow its cam 468, the pawl riding off the shield 480 and engaging with its ratchet to effect rocking of the shaft 448 and adjustment of the measuring chambers 402 as described. The downward rocking movement of the arms 456 may be adjustably limited by stop screws 483.

In practice one of the solenoids 488 may be connected in the underweight circuit 266 and is arranged to be energized to effect release of the latch 478 when the micro-switch 268 of the detecting mechanism 264 is closed, and the other solenoid 490 may be connected in the overweight circuit 270 and is arranged to be energized when the micro-switch 272 of the detecting mechanism is closed, thus effecting automatic adjustment of the measuring chambers 402 through definite increments when the detecting mechanism of the check weigher detects an abnormal average algebraic deviation of a group of packages check weighed beyond commercially acceptable limits.

Figures 15, 16, 17:
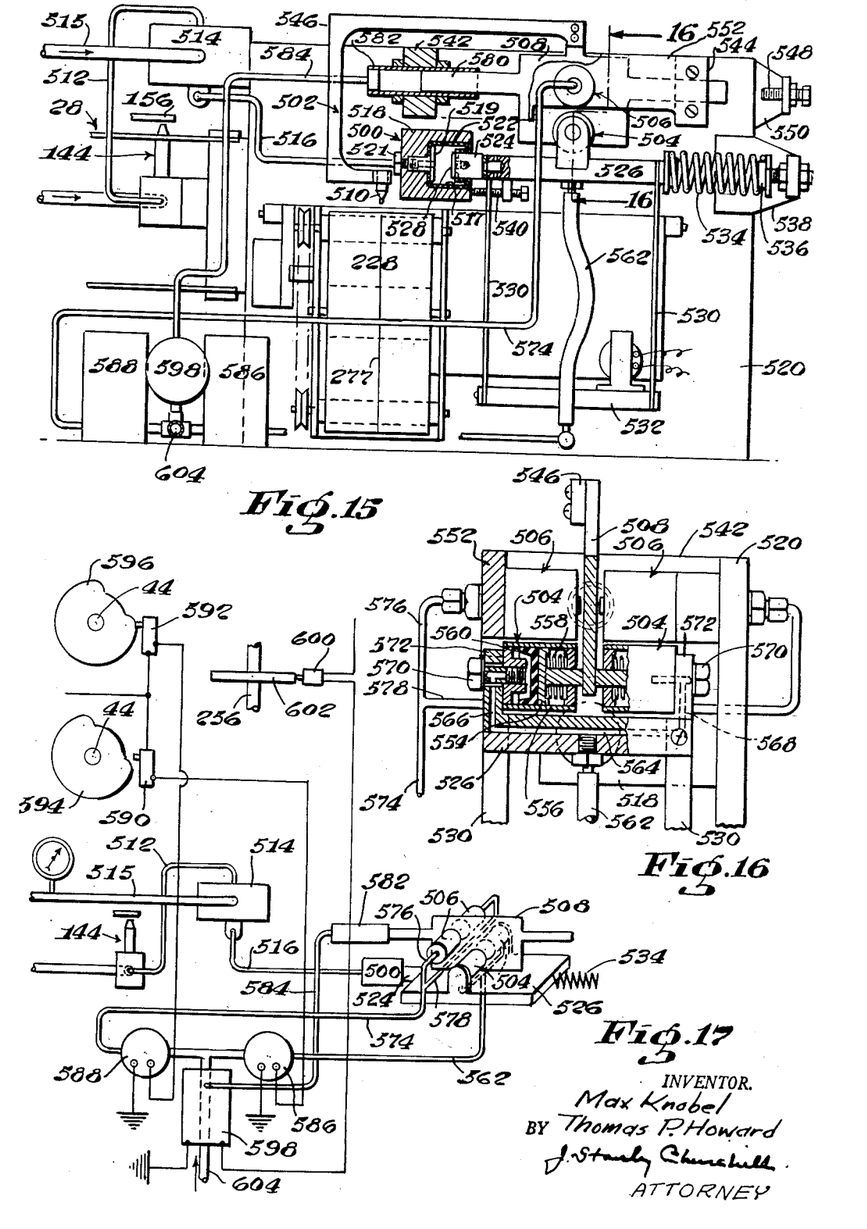
Fig. 15 is a side elevation of a modified form of indicating and recording mechanism.
Fig. 16 is a cross-sectional view taken on the line
Fig. 17 is a diagrammatic view of the mechanism shown in Fig. 15.

Referring now to Figs. 15, 16 and 17, a modified form of indicating and recording mechanism is illustrated wherein the pneumatically operated gauging unit 144 is operatively connected to a pressure-responsive element comprising a novel "rolling tube" bellows unit 500 arranged to actuate totalizing mechanism indicated generally at 502 and which includes two sets of air-brake units comprising a lower set of opposed air brakes 504 and an upper set of opposed air brakes 506 arranged to cooperate with a slide member 508 on which a marking pen 510 is mounted for cooperation with the graph paper 228.

In general, provision is made in the modified form of the invention illustrated in Fig. 15 for moving the marking pen 510 an increment of movement relative to the graph paper 228 a distance proportional to the weight of the load being check weighed in excess of the selected minimum weight and for totalizing successive increments of movement of the pen produced by the check weighing of a predetermined number of packages in order to obtain an indication of the average algebraic deviation of the weight of a plurality of packages from a predetermined weight, the total movement of the pen from an initial position providing a measure from which such average algebraic deviation may be readily determined.

As herein shown, the pneumatic gauging unit 144 is connected by an air line 512 to a conventional pressure transmitter or booster 514 having a high-pressure air supply through air line 515, and the pressure transmitter is connected by an air line 516 to the rolling tube bellows unit 500. As illustrated in cross section in Fig. 15, the bellows unit 500 comprises a cylindrical rubber tube 517 attached at one end to the bottom wall of a bored-out portion of a base member or block 518 attached to and extended from an upstanding frame plate 520, similar to the plate 172 in the previously described embodiment shown in Fig. 2. The inner end of the tube 517 is attached to the bottom wall of the block by a flanged fitting 519 extending over the turned-in edges of the tube, the stem of the flange member being extended into the block inlet and arranged to cooperate with a threaded pipe fitting 521 connected to the air line 516. The tube is contained from radial expansion by the side walls 522 of the bored-out portion and the other end of the tube is turned inwardly upon itself and secured to a movable member comprising an adapter 524 attached to the end of a bracket 526 mounted for horizontal reciprocation, the bracket and the adapter being constrained to a linear motion to hold it concentric with the base member or block 518. The turned-in end of the tube is attached to the adapter by a screw 528, the end being tucked under the head of the screw, as shown. The bracket 526 is supported upon vertical leaf springs 530 attached at their lower ends to a bracket 532 secured to and extended from the frame plate 520, the horizontally reciprocal bracket 526 and the relatively fixed bracket 532 together with the leaf springs 530 forming a four-bar parallel linkage permitting horizontal reciprocation of the bracket 526 and the air-brake unit 504 attached thereto. In the operation of the bellows unit 500, upon an increase in air pressure as effected by the pneumatic gauging unit 144, the cylindrical tube 517 "rolls" or "peels" on or from the restraining surfaces to effect movement of the bracket 526 upon which the lower air-brake unit 504 is mounted for movement therewith. The horizontally reciprocal bracket 526 is normally urged to the left, viewing Fig. 15, by a compression spring 534 interposed between the free end of the bracket 526 and an adjustable member 536 supported in a bracket 538 attached to the frame plate 520. The movement of the bracket 526 to the left may be adjustably limited by a stop screw 540 carried by the bracket 526 and engageable with the end of the base block 518, as illustrated. The slide member 508 is slidingly mounted in bearing arms 542, 544 attached to and extending from the frame plate 520. A bracket 546 attached to the slide carries the marking pen 510 for co-operation with the graph paper 228. The slide member 508 is initially moved to the right against a stop screw 548 adjustably mounted in a bracket 550 carried by the frame plate 520.

As above described, the lower pair of opposed air brakes 504 are carried by and movable with the horizontally reciprocal bracket 526 and are arranged to engage opposite sides of the plate 508 to effect movement of the plate therewith at the proper time in the cycle of operation, and the upper pair of opposed air brakes 506 are similarly arranged to engage opposite sides of the plate to hold the plate in the position to which it is moved by the lower pair of brake units 504. As illustrated in Fig. 16, one of the opposed upper brake units 506 is attached to the frame plate 520 and the cooperating opposing unit is attached to a bar 552 supported between the bearing arms 542, 544. Each air-brake unit may be similar in construction and mode of operation, and as herein shown, each unit may comprise a piston 554 slidingly mounted in a cylinder 556, the stem of the piston extending through an opening in an end wall of the cylinder for engagement with the plate 508. A spring 558 interposed between the end wall and the head of the piston normally urges the piston away from engagement with the plate 508, and the piston is arranged to be forced into engagement with the slide plate by air pressure provided through an inlet in the outer end wall of the cylinder. The outer face of the piston head may be provided with a rubber sealing washer 560, as shown.

As illustrated in Fig. 16, compressed air may be supplied to the lower pair of air brakes 504 through a flexible supply line 562 connected to the underside of the horizontally reciprocal bracket 526 and which communicates with a horizontal passageway 564 and connecting vertical passageways 566, 568 leading to the inlets of opposed brake units 504. As herein shown, each brake inlet includes a bolt 570 extending through an upstanding wall 572 of the bracket 526 and threadedly engaged with the outer end wall of its cylinder, the bolt 570 having a passageway formed therein for communication with the cylinder chamber, and the side wall 572 having a clearance opening for the bolt forming an annular chamber for communication with the supply passageway as clearly shown in Fig. 16. The upper pair of opposed air brakes 506 may be supplied with compressed air in a similar manner through a supply pipe 574 having a branch 576 connected to one brake unit, and a second branch 578 connected to the opposing brake unit. The slide plate 508 is initially moved to the right against its stop screw 548 by a piston and cylinder unit carried in the bearing arm 542, the piston 580 being extended from the plate 508, and the cylinder 582 being provided with compressed air by a supply pipe 584.

In the operation of the modified form of recording and totalizing mechanism, when the spring-beam check-weighing unit 28 is unlocked and released to perform the check-weighing operation, the pressure in the pneumatically operated unit 144 is increased by the movement of the valve 156 toward the unit when the spring beam is deflected, and consequently, the rolling bellows will be elongated to move the horizontally reciprocal bracket 526, and the brake unit 504 carried thereby to the right a distance proportionate to the weight of the load being check weighed in excess of the selected minimum weight, as indicated by the increase in pressure in the unit 144. The rolling-bellows unit 500 is constructed to quickly and accurately respond to any changes in pressure by merely rolling in and out without any stretching of the rubber tube and without friction between the turned-in or rolled-down portions since the air pressure keeps the inner surfaces of the rolling portions separated and the tube is constrained by the walls of the block to move in a linear path. As a result, a relatively great linear movement may be obtained and with minimum hysteresis to provide an extremely accurate movement of the bracket 526 and its brake unit a distance directly proportionate to the pressure applied to the bellows.

During the movement of the horizontally reciprocal bracket 526 to the right, the air-brake unit 504 is in its open or non-engaging position relative to the plate 508, and the brake unit 506 is in braking engagement with the plate to hold it stationary, and when the bracket 526 comes to rest at the position to which it is moved by the increase in pressure in the bellows, the brake unit 504 engages and the brake unit 506 disengages the plate 508. Thereafter, the spring beam 28 is again locked, thus elevating the valve 156 away from the pneumatically operated gauging unit 144 to effect a reduced pressure therein and in the rolling bellows 500 to permit the spring 534 to move the brake-carrying bracket 526 to the left until the stop screw 540 engages the block 518, the totalizing plate 508 being moved along with the bracket 526 away from the stop screw 548. The totalizing plate is thus advanced to the left an increment of movement comprising a measure of the excess of the weight of the load above the selected minimum weight. The brake unit 506 is then engaged to hold the plate 508 in its moved position, and the brake unit 504 is disengaged in readiness for a succeeding cycle of operation.

At the completion of a predetermined number of cycles of operation of the check weigher, the recording paper 228 is rocked upwardly into engagement with the pen 510 during the non-weighing or recording cycle in a manner similar to that described in connection with the embodiment illustrated in Figs. 2 and 4 whereby to provide a visual indication of the average deviation from a predetermined weight of a plurality of packages. In practice, the pen 510 is initially disposed in a position to the right of the central line 277 of the graph paper, and in the event that successive packages being check weighed are all of a substantially predetermined weight, successive increments of movement of the totalizing plate 508 will be substantially uniform so that at the end of a predetermined number of cycles of operation the recording pen will be disposed in substantial alignment with the central line 277 indicating that the packaging mechanism is functioning correctly to produce loads of predetermined weights. In the event that some or all of the packages of the group check weighed vary from the predetermined weight but are each of a weight above the selected minimum, the marking pen 510 will be disposed to engage and mark the paper at a point to the right or left of the central line 277 as the case may be.

After the recording operation is performed, the totalizing plate 508 is returned to its initial position to the right against the stop 548 by the pneumatically operated piston and cylinder unit 582, as above described, both brake units 504, 506 being disengaged from the plate during the resetting operation, the upper unit 506 again engaging the plate after it has been moved against the stop 548.

In order to automatically effect engagement and disengagement of the brake units 504, 506 in the above-described sequence and in timed relation to successive check-weighing operations, each air line 562, 574 is provided with a solenoid-operated air valve 586, 588 respectively which may be of any usual or preferred commercially available type. The solenoid-operated valves 586, 588 are included in an electrical circuit provided with micro-switches 590, 592 which are arranged to be operated by cams 594, 596 respectively fast on the main cam shaft 44 of the check-weighing machine, as diagrammatically indicated in Fig. 17. The cams 594, 596 are designed to open and close the solenoid-operated air valves 586, 588 to effect engagement and disengagement of the air brakes 504, 506 respectively in the manner above described. A third solenoid-operated air valve 598 is connected in the air line 584 leading to the resetting cylinder 582, the valve 598 being controlled by a micro-switch 600 operated by a cam 602 fast on the cam shaft 256, the cam 602 being designed to close the switch 600 and open the valve 598 after the predetermined number of cycles of check-weighing operation whereby to return the totalizing plate 508 to its initial position against the stop 548 after the recording operation, as above described. Compressed air may be supplied to the solenoid-operated air valves through a supply pipe 604.

While the preferred embodiment of the invention has been herein illustrated and described it will be understood that the invention may be embodied in other forms within the scope of the following claims.

Having thus described the invention, what is claimed is:

1. A check-weighing machine having, in combination, check-weighing mechanism including means for determining the variation in the weight of an article from a predetermined weight, pneumatic means operatively connected with and controlled by said variation-determining means for ascertaining the average algebraic deviation of a plurality of the weighed articles from the aforesaid predetermined weight, and indicating means for indicating such average algebraic deviation.

2. A check-weighing machine having, in combination, check-weighing mechanism including means for determining the variation in the weight of an article from a predetermined weight, pneumatic means operatively connected with and controlled by said variation-determining means for ascertaining the average algebraic deviation of a plurality of the weighed articles from the aforesaid predetermined weight, and means for recording such average algebraic deviations on a graph.

3. A check-weighing machine having, in combination, check-weighing mechanism including a weighing element arranged to be moved in proportion to the load being weighed by said weighing element, a member mounted for linear movement, pneumatic connections between the weighing element and said movable member for moving the member through successive cumulative increments by variations in pneumatic pressure responsive to the excess of each check-weighed load in a predetermined group above a predetermined minimum limit, and calibrated means cooperating with said movable member for indicating the average algebraic deviation of the members of the group check weighed.

4. A check-weighing machine having, in combination, check-weighing mechanism including an element arranged to be moved in proportion to the load being check weighed, means arranged to be moved by pneumatic pressure controlled by said weighing element during each of a number of check weighings an amount proportionate to the excess of each check-weighed load above a selected minimum, and graphic recording means for recording the position to which said member has been moved after a predetermined number of check weighings.

5. A check-weighing machine as defined in claim 4 wherein the graphic recording means is calibrated to graphically record the average algebraic deviation of a plurality of the check-weighed articles.

6. A check-weighing machine having, in combination, check-weighing mechanism including a weighing element having load-supporting means upon which the article to be check weighed may be placed, adjustable means cooperating with the weighing element for regulating the minimum weight limit above which loads supplied to the load-supporting member cause movement of the weighing element in proportion to the excesses of the weighed loads above such minimum limit, and means including a pneumatic circuit rendered operative by such movements of the weighing element for determining the variation in the weights of the articles being check weighed from a predetermined weight by variations in the pneumatic pressure in said circuit, means connected with and controlled by said variation-determining means for ascertaining the average algebraic deviation of a plurality of said check-weighed articles from the aforesaid predetermined weight, and indicating means for indicating such algebraic deviation.

7. A check-weighing machine as defined in claim 6 wherein an adjustable spring is utilized to adjustably determine the minimum weight limit.

8. The combination with load-forming mechanism for forming successive loads, of check-weighing mechanism comprising means including a pneumatic circuit for determining the variation of a plurality of check-weighed loads from a predetermined weight, means operatively connected with and controlled by said variation-determining means for ascertaining the algebraic average deviation of a plurality of weighed loads from the aforesaid predetermined weight, and means for thereafter automatically increasing or decreasing the weight of a load formed by the load-forming mechanism in the event that the above average deviation varies beyond predetermined amounts.

9. The combination with a volumetric load-measuring mechanism for forming successive loads, of check-weighing mechanism comprising means including a pneumatic circuit for determining the variation of a plurality of check-weighed loads from a predetermined weight, means operatively connected with and controlled by said variation-determining means for ascertaining the algebraic average deviation of a plurality of the measured loads from the aforesaid weight, and means for thereafter automatically increasing or decreasing the volume of a measured load formed by the load-measuring mechanism in the event that the above average deviation varies beyond predetermined amounts.

10. The combination with load-forming mechanism for forming successive loads, of check-weighing mechanism comprising means including a pneumatic circuit for determining the variation of a plurality of check-weighed loads from a predetermined weight, means operatively connected with and controlled by said variation-determining means for ascertaining the algebraic average deviation of a plurality of the weighed loads from the aforesaid predetermined weight, and means for thereafter automatically increasing or decreasing by a definite increment the weight of a load formed by the load-forming mechanism in the event that the above average deviation varies beyond predetermined amounts.

11. The combination wtih a packaging machine having load-forming mechanism for forming successive loads, of check-weighing mechanism comprising a weighing element movable in proportion to excesses in the weighed loads above a predetermined minimum limit, a pneumatically actuated member arranged to be moved by variations in pneumatic pressure in proportion to such excesses, means rendered operative in response to the position of said movable member at the end of a predetermined number of check-weighing operations for increasing or decreasing by a definite increment the weight of the loads thereafter produced by the load-forming mechanism accordingly as the position of said movable member is above or below predetermined positions corresponding to permissible tolerances.

12. A check-weighing machine as defined in claim 6 wherein the means for ascertaining the algebraic deviation includes a rolling bellows, a first member connected with the rolled end of said bellows to be moved linearly in accordance with variations in the pneumatic pressure within the bellows, and a second member arranged to be successively moved through increments proportional to the distance to which the first member is moved.

13. A check-weighing machine as defined in claim 6 wherein the means for ascertaining the algebraic deviation includes a rolling bellows, a first member connected with the rolled ends of said bellows, a second member, and pneumatically operated clutch mechanism between said members arranged to effect movement of the second member a distance proportional to the algebraic sum of the successive increments through which the first member is moved.

14. In a check-weighing machine as defined in claim 6, mechanism for translating minute movements of the weighing element into linear movement of a member of the totalizing mechanism including a pneumatically operated rubber tube having one end arranged to roll upon the body of the tube and to which said member is connected.

15. In a check-weighing machine as defined in claim 6, mechanism for translating minute movements of the weighing element into linear movement of a member of the totalizing mechanism including a pneumatically operated rubber tube having one end arranged to roll upon the body of the tube and to which said member is connected, a second member of the totalizing mechanism and pneumatically operated clutch mechanism connecting said first and second members to impart successive movements in one direction to the second member from successive movements of the first member.

MAX KNOBEL.
THOMAS P. HOWARD.

No references cited.